(12) United States Patent  
Hersacher et al.

(10) Patent No.: US 7,866,701 B2
(45) Date of Patent: Jan. 11, 2011

(54) SLIDING CARRIAGE FOR A HEIGHT ADJUSTER OF A SAFETY BELT SYSTEM

(75) Inventors: Markus Hersacher, Bopfingen (DE); Frank Ramsak, Schechingen (DE)

(73) Assignee: TRW Automotive GmbH, Alfdorf (DE)

( * ) Notice: Subject to any disclaimer, the term of this patent is extended or adjusted under 35 U.S.C. 154(b) by 151 days.

(21) Appl. No.: 12/215,570

(22) Filed: Jun. 30, 2008

(65) Prior Publication Data

US 2009/0015055 A1 Jan. 15, 2009

(30) Foreign Application Priority Data

Jul. 12, 2007 (DE) .................. 10 2007 032 547

(51) Int. Cl.
B60R 22/20 (2006.01)
(52) U.S. Cl. .................. 280/801.2; 280/808
(58) Field of Classification Search .......... 280/801.1, 280/801.2, 804, 805, 806, 808; 297/468, 297/470, 471, 473
See application file for complete search history.

(56) References Cited

U.S. PATENT DOCUMENTS 4,989,900 A * 2/1991 Steinhuser .................. 280/808
5,460,410 A 10/1995 Petzi et al.
5,482,325 A * 1/1996 Moller et al. ............ 280/801.2
5,692,780 A * 12/1997 Yasui ....................... 280/801.2
5,758,901 A * 6/1998 Harenberg ............... 280/801.2
5,794,977 A * 8/1998 Frank ....................... 280/801.2

FOREIGN PATENT DOCUMENTS

DE 4325662 2/1995
DE 19930156 1/2001

OTHER PUBLICATIONS

Merriam-Webster's Defintion of Stamp.*

* cited by examiner

Primary Examiner—Eric Culbreth
Assistant Examiner—Joseph Rocca
(74) Attorney, Agent, or Firm—Tarolli, Sundheim, Covell & Tummino LLP

(57) ABSTRACT

A sliding carriage for a height adjuster of a safety belt system has a carrier plate and an attachment structure for a deflector fitting, the attachment structure being made in one piece with the carrier plate. The carrier plate includes a bending portion in which the carrier plate becomes bent when a predetermined force acting on the deflector fitting is exceeded.

13 Claims, 4 Drawing Sheets

SLIDING CARRIAGE FOR A HEIGHT ADJUSTER OF A SAFETY BELT SYSTEM

FIELD OF THE INVENTION

The present invention relates to a sliding carriage for a height adjuster of a safety belt system.

BACKGROUND OF THE INVENTION

Height adjusters permit a vehicle occupant to adjust the position of the upper belt deflection point according to his/her personal needs.

In a height adjuster, the belt deflector fitting is, as a rule, mounted to a sliding carriage which for its part is guided in a rail for sliding motion in one shifting direction, suitably the vertical direction. A locking mechanism makes sure that the sliding carriage can be arrested in different positions.

In case of an accident, the force which the occupant exerts on the safety belt is transmitted into the vehicle via the deflector fitting, the sliding carriage and the rail. This means that the sliding carriage needs to satisfy requirements as regards high stability, but of course also as regards cost-effective manufacturing.

It is an object of the invention to provide a low-cost sliding carriage for a height adjuster.

BRIEF SUMMARY OF THE INVENTION

This is achieved in a sliding carriage for a height adjuster of a safety belt system that comprises a carrier plate and an attachment structure for a deflector fitting, the attachment structure being made in one piece with the carrier plate. The carrier plate includes a bending portion in which the carrier plate becomes bent when a predetermined force acting on the deflector fitting is exceeded. This design offers the advantage that a one-piece carrier plate can be employed without any special reinforcement in the region of the attachment structure for the deflector fitting. The lower inherent stability of the carrier plate is compensated for by a more favourable force distribution owing to the methodical bending of the carrier plate by a predefined extent and exclusively in the bending portion, which occurs with the action of force, e.g., in an accident.

Owing to the carrier plate becoming bent, those portions of the carrier plate which are especially highly loaded, such as the attachment structure, are able to align themselves in the direction of the tensile force. This reduces the transverse forces exerted on the attachment structure. In conventional sliding carriages in which no alignment of the attachment structure occurs, such transverse forces produce high stresses in a direction in which the inherent stability of the structure under load is low, owing to the geometry thereof. In order to avoid damage to the attachment structure or the carrier plate here, normally these portions are reinforced, for them to be able to take up the high transverse forces. It has turned out that the configuration according to the invention allows the static breaking load values to be markedly increased in comparison with one-piece carrier plates used up to now.

In this way, a deformation of the attachment structure is counteracted. The alignment in the direction of force is possible because the carrier plate bends in the bending portion.

The deformation may occur perpendicularly to the plane of extension of the carrier plate, for example.

The bending is effected at a force which exceeds the normal operating forces, i.e. in the case of an accident, for instance, but not only when extreme forces occur as would not even be expected in a severe accident.

The bending portion advantageously extends across the entire carrier plate perpendicularly to the shifting direction. There is preferably no further deformation of the carrier plate outside of the bending portion.

Preferably, the bending portion comprises one or more recesses in the carrier plate, which cause a weakening of material in the bending portion. As an alternative, one or more stamped bending sections may also be provided, which bring about the same effect. A combination of recesses and stamped bending sections is likewise conceivable.

The recesses can be formed as through openings in the carrier plate. In this way, the bending portion may be manufactured at low cost, such as by punching.

To achieve good absorption of forces, the bending portion may be arranged between the attachment structure and a locking-device which engages into a guide rail. Accordingly, the bending portion lies between the point of force transmission into the carrier plate and the point of force transmission of the sliding carriage into the vehicle-fixed rail of the height adjuster.

In a preferred embodiment, the attachment structure is a threaded cup into which a stud for attachment of the deflector fitting can be screwed. Preferably, no deformation of this threaded cup takes place, not even when the predetermined force is exceeded.

For a further increase in stability, at least one stamped portion may be provided in the carrier plate. A suitable stamped portion increases the dimensional stability of the attachment structure and in this way contributes to ensuring that a deformation occurs only in the bending portion of the carrier plate.

A stamped portion on the side of the attachment structure opposite the bending portion has turned out to be of advantage.

An increase in stability may be provided in addition if an edge of the carrier plate comes into contact with the guide rail and can thus rest against a vehicle-fixed part when the predetermined force acts and the carrier plate becomes bent.

DETAILED DESCRIPTION OF PREFERRED EMBODIMENTS

Figure 1:
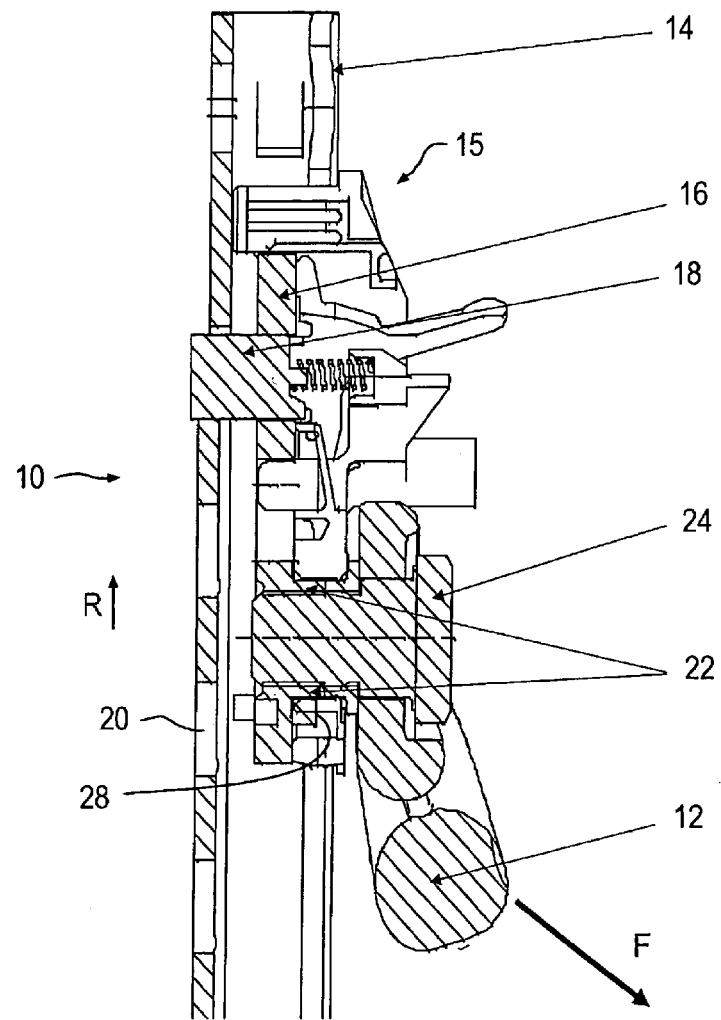
FIG. 1 shows a height adjuster with a sliding carriage according to the invention, in a schematic sectional view.

FIG. 1 shows a height adjuster 10 for a deflector fitting 12 of a safety belt system in a vehicle.

A rail 14 is attached so as to be fixed to the vehicle, e.g. in the longitudinal direction to a B-pillar of the vehicle. A sliding carriage 15 is shiftingly mounted to the rail 14. The sliding carriage 15 may be moved both in and against a shifting direction R. The load-bearing component of the sliding carriage 15 is a carrier plate 16 made of metal which is held, at least in sections, in lateral guides of the rail 14.

A locking device 18 is provided in order that the sliding carriage 15 can be locked in specific positions. The locking device 18 is attached in an opening 19 of the carrier plate 16 by means of a known mechanism and can engage into recesses 20 on the rail 14 which are arranged at predefined distances.

An attachment structure 22 is formed in one piece with the carrier plate 16. The attachment structure 22 serves to attach the deflector fitting 12 to the carrier plate 16. This type of height adjuster is known in principle and will not be described here in greater detail.

In the examples shown, the attachment structure 22 has the shape of a threaded cup into which a bolt 24 may be screwed, and has an annular collar 23 which protrudes perpendicularly from the plane E of extension of the carrier plate 16. The attachment structure 22 is configured close to the edge 30 (the lower edge in FIG. 1) of the carrier plate 16. No separate parts are employed as reinforcement in the region of the attachment structure 22.

Figure 2:
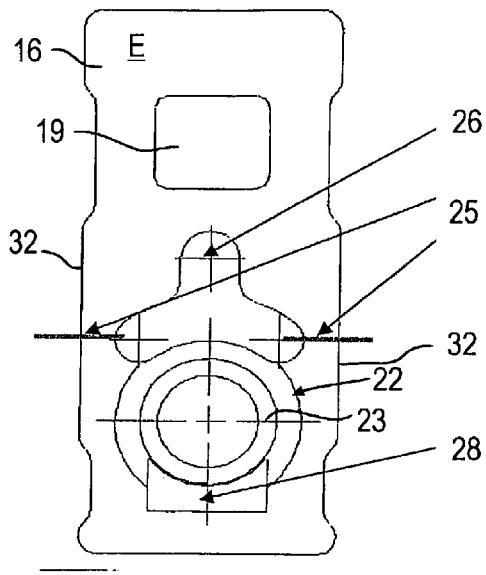
FIG. 2 shows a carrier plate of a sliding carriage according to the invention.
Figure 3:
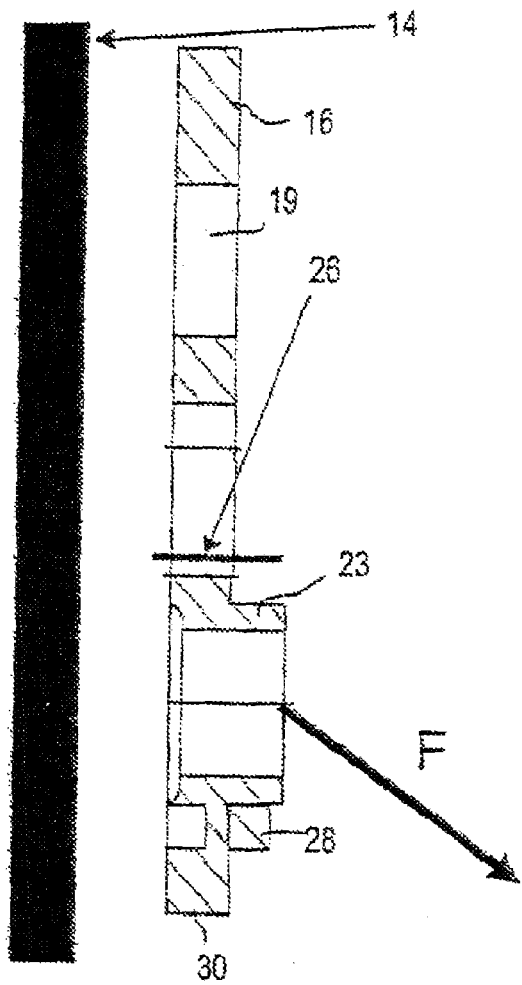
FIG. 3 shows a schematic section through the carrier plate illustrated in FIG. 1 prior to the action of the predetermined force.

A bending portion 25 is provided in the carrier plate 16 between the attachment structure 22 and the locking device 18 (see FIG. 2). The bending portion 25 comprises recesses 26 and webs 27 of material which remain between the recesses 26 and the lateral edges 32 of the carrier plate 16. The carrier plate 16 is so weakened in the bending portion 25 that when a load is exerted in the force direction F by a tensile force being applied on the belt webbing, a deformation of the carrier plate 16, more specifically exclusively in the bending portion 25, occurs when a predetermined force acting on the deflector fitting 12 is exceeded (see FIGS. 3 and 4).

This deformation permits the attachment structure 22 to align itself in the direction of the force F, whereby the transverse forces applied on the attachment structure 22 are reduced. The loading caused by the pull on the belt webbing then acts in the longitudinal direction of the threaded cup, that is, in a direction in which this structure is capable of taking up considerably higher forces than in a direction perpendicular thereto. Although the carrier plate is made structurally weaker than those of conventional sliding carriages, it can readily withstand the loads in the case of an accident.

Shown below the attachment structure 22 in each of the Figures, a stamped portion 28 is formed in the carrier plate 16, in which the material of the carrier plate 16 is in some places deformed perpendicularly to the plane E of extension of the carrier plate 16. This stamped portion 28 increases the stability in the lower region of the attachment structure 22.

Figure 4:
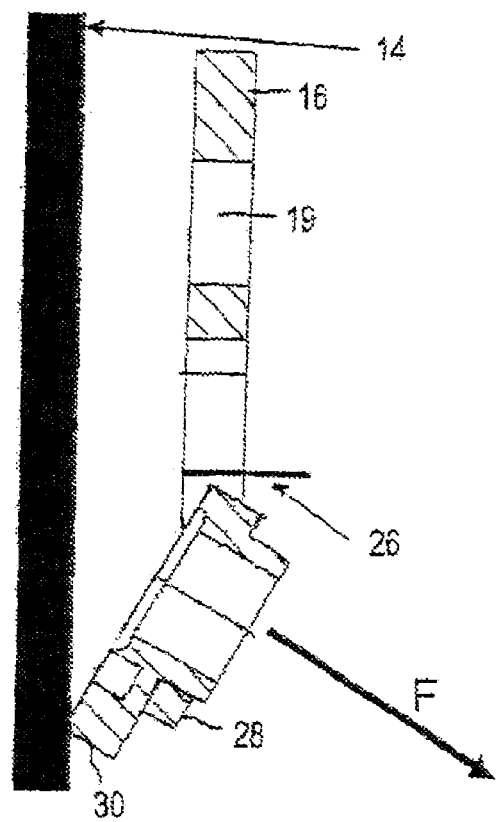
FIG. 4 shows the carrier plate illustrated in FIG. 3 after the action of the predetermined force.

When the carrier plate 16 is deformed, in this instance perpendicularly to its plane E of extension, the edge 30, i.e. the lower edge in the Figures, comes into contact with the rail 14, resting against it and, thus, against a vehicle-fixed part. This is shown in FIG. 4.

The lateral edges 32 of the carrier plate 16 are at least partly guided in the rail 14, so that the carrier plate 16 can not even become detached from the rail 14 during the deformation process.

Despite the deformation appearing, this design increases the fracture load of the carrier plate 16 considerably in comparison with conventional rigid one-piece carrier plates, e.g. by more than 4 kN when subjected to a static load.

Various options are available for realizing the bending portion 25. Any geometry is applicable that results in a flexibility of the carrier plate 16 allowing the attachment structure to align itself in the direction of the acting force, above all in combination with a stamped portion 28 that effects a stabilization of the attachment structure 22.

FIG. 1 shows that a through recess 26 having a trilobate shape is formed in the bending portion 25, the wider end of the recess 26 directly adjoining the edge of the attachment structure 22.

The stamped portion 28 directly adjoins the attachment structure 22 on the side thereof opposite the bending portion 25 and is matched to the curvature of the attachment structure 22 on one edge, while the opposite edge runs parallel to the lower edge 30 of the carrier plate 16. The stamped portion 28 is pressed out of the plane E of extension of the carrier plate 16 in the same direction as the collar 23 of the attachment structure 22.

FIGS. 5 to 13 show further possible geometries for the bending portion 25, more precisely the recess 26, and the stamped portion 28. To tell the individual variants apart, a letter is added to each of the corresponding reference numbers.

The bending portion 25 is realized here by weakenings in the form of recesses passing through the carrier plate 16. The recesses may be produced by drilling or punching, for example. Alternatively or in combination, appropriate stamped bending sections may also be provided instead of the recesses.

The stamped portion 28 always consists in a deformation of the material of the carrier plate 16 out of the plane E of extension thereof, but without breaking through the material at this location.

In each of the examples according to FIGS. 5 to 8, a plurality of circular recesses 26a-26d is provided in the bending portion 25, arranged close to the circumference of the attachment structure 22.

In FIGS. 9 to 13, one respective recess 26e-26i in the shape of a circular arc is arranged in the bending portion 25 in the immediate vicinity of the circumference of the attachment structure 22.

Figure 5:
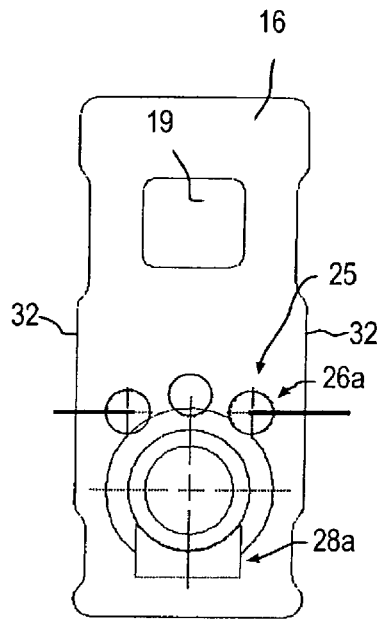
FIGS. 5 to 13 show various exemplary embodiments of a carrier plate of a sliding carriage according to the invention.
Figure 6:
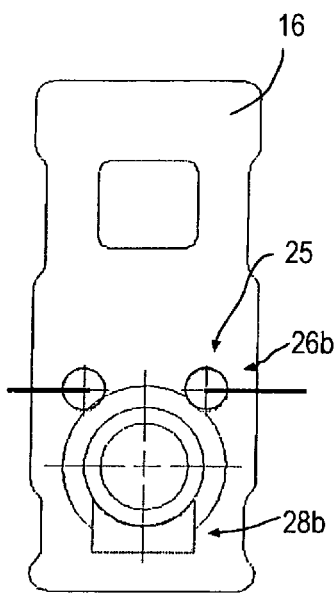

In FIGS. 5 and 6, the shape of the stamped portion 28a, 28b corresponds to that of the stamped portion 28 in FIG. 2.

Figure 7:
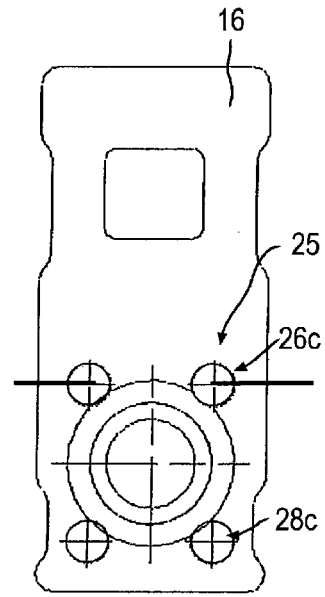
Figure 8:
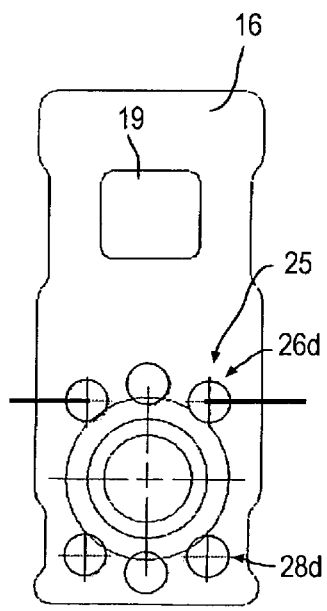
Figure 9:
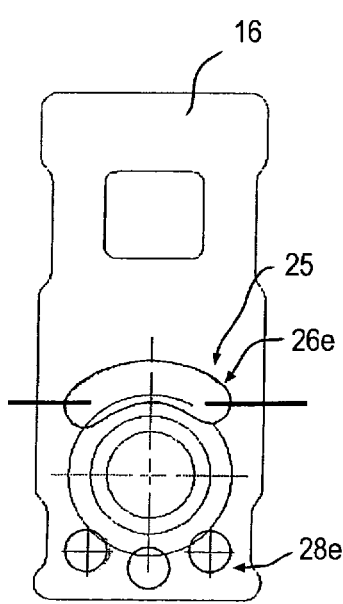
Figure 10:
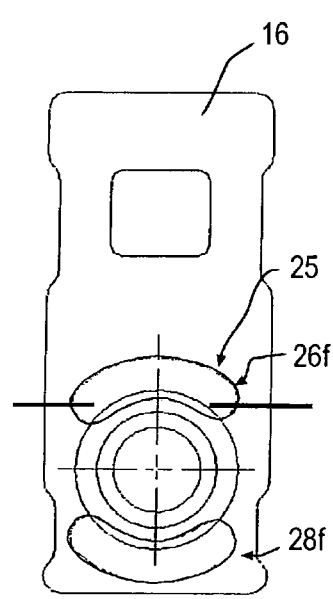

In FIGS. 7 to 9, the stamped portion 28c-28e is each formed by a plurality of circular structures that are arranged close to the circumference of the attachment structure 22.

In FIGS. 10 to 13, the stamped portion 28f-28i is formed by a structure having the shape of a circular arc, which directly adjoins the circumference of the attachment structure 22.

Figure 11:
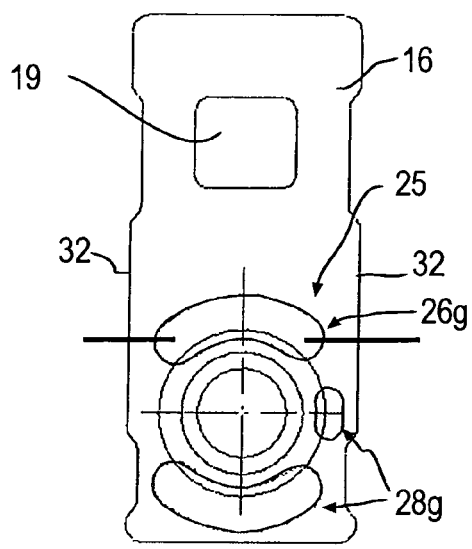
Figure 12:
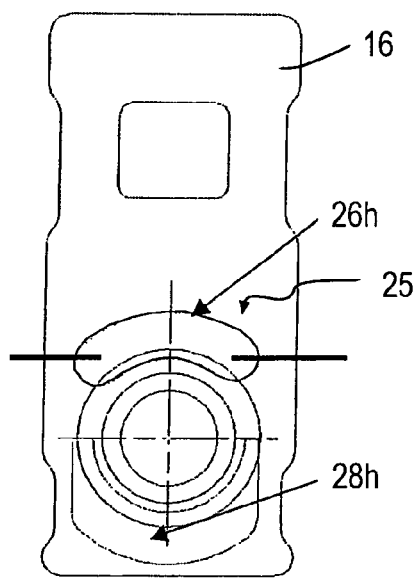
Figure 13:
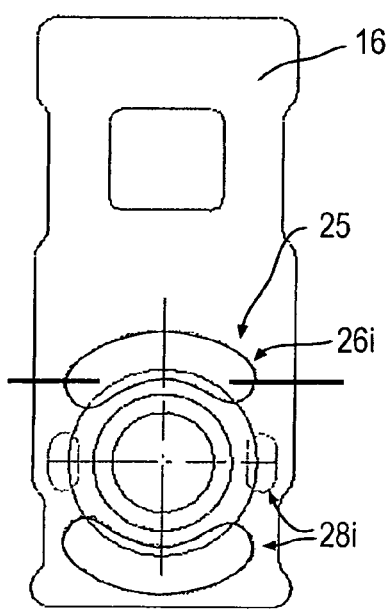

In FIGS. 11 and 13, additional stamped portions 28g, 28i are provided in the region of the circumference of the attachment structure 22 on the right-hand and left-hand lateral edges 32, respectively, of the carrier plate 16.

The bending portion 25 is always disposed between the opening 19 of the locking device 18 and the attachment structure 22. The stamped portion 28, 28a-28i is each located between the attachment structure 22 and the lower edge 30 of the carrier plate 16.

The invention claimed is:

1. A sliding carriage for a height adjuster of a safety belt system, comprising
a carrier plate (16) and an attachment structure (22) for a deflector fitting (12),
the attachment structure (22) being made in one piece with the carrier plate (16),
the carrier plate (16) including a bending portion (25) in which the carrier plate (16) becomes bent when a predetermined force acting on the deflector fitting (12) is exceeded, and
the carrier plate (16) including an opening (19) for a locking device (18), wherein the bending portion (25) is positioned between the attachment structure (22) and the locking device (18).

2. The sliding carriage according to claim 1, wherein upon an action of the predetermined force, the attachment structure (22) aligns itself in the direction of the force (F).

3. The sliding carriage according to claim 1, wherein the bending portion (25) comprises at least one recess (26; 26a-26i) in the carrier plate.

4. The sliding carriage according to claim 3, wherein the recesses (26; 26a-26i) are formed as through openings in the carrier plate (16).

5. The sliding carriage according to claim 1, wherein the bending portion (25) comprises at least one stamped bending section.

6. The sliding carriage according to claim 1, wherein the locking device (18) engages a rail (14) to block sliding movement of the carrier plate (16) relative to the rail (14).

7. The sliding carriage according to claim 1, wherein the attachment structure (22) is a threaded cup.

8. The sliding carriage according to claim 1, wherein at least one stamped portion (28; 28a-28i) is provided in the carrier plate (16).

9. The sliding carriage according to claim 8, wherein the stamped portion (28; 28a-28i) is located on the side of the attachment structure (22) opposite the bending portion (25).

10. The sliding carriage according to claim 1, wherein the sliding carriage is mounted on a rail (14), and an edge (30) of the carrier plate (16) comes into contact with the rail (14) when the predetermined force acts and the carrier plate (16) becomes bent.

11. The sliding carriage according to claim 1, wherein the carrier plate (16) extends along a plane (E), the bending portion (25) being positioned within the plane (E).

12. The sliding carriage according to claim 11, wherein before the predetermined force is exceeded the attachment structure (22) extends at a first angle relative to the plane (E), the attachment structure (22) extending at a second, different angle relative to the plane (E) when the predetermined force is exceeded.

13. A sliding carriage for a height adjuster of a safety belt system, comprising
a carrier plate (16) and an attachment structure (22) for a deflector fitting (12),
the attachment structure (22) being made in one piece with the carrier plate (16), and
the carrier plate (16) including a bending portion (25) in which the carrier plate (16) becomes bent when a predetermined force acting on the deflector fitting (12) is exceeded,
wherein the sliding carriage is slidably mountable in a shifting direction (R) and the bending portion (25) extends across the entire carrier plate (16) perpendicularly to the shifting direction (R).

* * * * *